US012380226B1

(12) United States Patent
Kilbride et al.

(10) Patent No.: US 12,380,226 B1
(45) Date of Patent: Aug. 5, 2025

(54) AUTONOMOUS VEHICLE SENSOR SECURITY, AUTHENTICATION AND SAFETY

(71) Applicant: Waymo LLC, Mountain View, CA (US)

(72) Inventors: Thomas Kilbride, San Francisco, CA (US); Lucas Duffey, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 321 days.

(21) Appl. No.: 17/704,508

(22) Filed: Mar. 25, 2022

Related U.S. Application Data

(60) Provisional application No. 63/197,039, filed on Jun. 4, 2021.

(51) Int. Cl.
G06F 21/60 (2013.01)
H04L 9/32 (2006.01)
H04L 9/40 (2022.01)

(52) U.S. Cl.
CPC .......... G06F 21/602 (2013.01); H04L 9/3263 (2013.01); H04L 63/061 (2013.01); H04L 2209/84 (2013.01)

(58) Field of Classification Search
CPC ... G06F 21/602; H04L 9/3263; H04L 63/061; H04L 2209/84
See application file for complete search history.

(56) References Cited

U.S. PATENT DOCUMENTS

| 4,200,770 | A   | * | 4/1980 | Hellman | H04L 9/0844 |
|   |   |   |   |   | 713/169 |
| 9,916,259 | B1 | * | 3/2018 | Nordin | G06F 12/0891 |
| 10,710,719 | B1 |   | 7/2020 | Lott, III | |
| 11,038,897 | B1 | * | 6/2021 | Wilson | H04L 63/107 |
| 11,144,911 | B2 | * | 10/2021 | Smith | G06Q 20/367 |

(Continued)

FOREIGN PATENT DOCUMENTS

| CN | 105512640 A | 4/2016 |
| KR | 20210034097 A | 3/2021 |

(Continued)

OTHER PUBLICATIONS

Lopez et al., Security of Emergent Automotive Systems—A Tutorial Introduction and Perspectives on Practice (Year: 2019).*

(Continued)

Primary Examiner — Samson B Lemma
(74) Attorney, Agent, or Firm — Lowenstein Sandler LLP

(57) ABSTRACT

A method includes sending, by a processing device to a sensor component of a sensing system of an autonomous vehicle (AV), a request to establish a session with the sensor component. The sensor component includes a sensor, a sensor controller and a first cryptographic coprocessor, and the processing device includes a second cryptographic coprocessor operatively coupled to a hardware accelerator. The method further includes determining, by the processing device, whether the sensor component acknowledges the request and, in response to determining that the sensor component acknowledges the request, establishing, by the processing device, the session with the sensor component.

20 Claims, 7 Drawing Sheets

(56) References Cited

U.S. PATENT DOCUMENTS

| | | | |
|---|---|---|---|
| 2009/0138946 A1* | 5/2009 | Schneider | G06F 21/33 |
| | | | 726/5 |
| 2009/0141166 A1 | 6/2009 | Kim et al. | |
| 2015/0052351 A1* | 2/2015 | Nodehi Fard Haghighi | |
| | | | H04L 63/0428 |
| | | | 713/156 |
| 2016/0134419 A1* | 5/2016 | Smith | H04L 9/0833 |
| | | | 380/30 |
| 2017/0026176 A1* | 1/2017 | Schmidt | H04L 9/0861 |
| 2017/0063853 A1* | 3/2017 | Lim | H04L 9/3242 |
| 2017/0132477 A1* | 5/2017 | Kim | G08G 1/096716 |
| 2017/0244565 A1* | 8/2017 | Bronk | H04W 12/106 |
| 2017/0285633 A1* | 10/2017 | Poornachandran | G08G 5/0069 |
| 2017/0324566 A1* | 11/2017 | Kawasaki | H04L 9/006 |
| 2017/0346640 A1* | 11/2017 | Smith | H04L 9/14 |
| 2018/0069708 A1* | 3/2018 | Thakore | H04L 9/006 |
| 2018/0103036 A1* | 4/2018 | Fox | H04W 12/069 |
| 2018/0164813 A1* | 6/2018 | Poeppel | G06Q 10/0631 |
| 2018/0204399 A1* | 7/2018 | Newman | G07C 9/28 |
| 2018/0300489 A1* | 10/2018 | Roth | G06F 21/602 |
| 2018/0323977 A1* | 11/2018 | Hojsik | H04L 67/12 |
| 2019/0057268 A1 | 2/2019 | Burge et al. | |
| 2019/0068582 A1* | 2/2019 | Kim | G01S 5/0072 |
| 2019/0159762 A1 | 5/2019 | Li | |
| 2019/0208442 A1* | 7/2019 | Amorim de Faria Cardote | |
| | | | H04L 9/3239 |
| 2019/0281052 A1* | 9/2019 | Lekkas | H04L 9/14 |
| 2020/0045540 A1* | 2/2020 | Hutchison | H04W 4/38 |
| 2020/0092113 A1* | 3/2020 | Hutchison | H04L 9/3263 |
| 2020/0145409 A1* | 5/2020 | Pochuev | H04L 63/0853 |
| 2020/0159930 A1* | 5/2020 | Venkateswaran | H04L 9/3247 |
| 2020/0193036 A1* | 6/2020 | Roth | G06F 21/602 |
| 2020/0193065 A1* | 6/2020 | Smith | G06F 21/73 |
| 2020/0259885 A1* | 8/2020 | Alam | G06F 9/5027 |
| 2020/0293042 A1 | 9/2020 | Sakurada | |
| 2020/0313873 A1* | 10/2020 | Mondello | H04L 9/0825 |
| 2020/0313909 A1* | 10/2020 | Mondello | H04L 9/0866 |
| 2020/0313911 A1* | 10/2020 | Mondello | H04L 9/3268 |
| 2021/0003711 A1 | 1/2021 | Vandenberg, III et al. | |
| 2021/0035279 A1 | 2/2021 | Hu et al. | |
| 2021/0092604 A1* | 3/2021 | Fox | H04L 9/0891 |
| 2021/0117242 A1* | 4/2021 | Van De Groenendaal | |
| | | | H04L 67/1001 |
| 2021/0176071 A1* | 6/2021 | Maass | H04L 67/10 |
| 2021/0203492 A1* | 7/2021 | Soares de Resende | |
| | | | H04L 63/0428 |
| 2021/0250174 A1* | 8/2021 | Cheng | H04L 9/0869 |
| 2021/0281408 A1* | 9/2021 | Liu | G06F 7/588 |
| 2021/0284140 A1 | 9/2021 | Hayakawa et al. | |
| 2021/0288822 A1* | 9/2021 | Sorensen | H04L 9/321 |
| 2021/0306141 A1* | 9/2021 | Ruth | H04L 63/0823 |
| 2021/0362733 A1 | 11/2021 | Yoon et al. | |
| 2022/0032955 A1 | 2/2022 | Xiang et al. | |
| 2022/0073106 A1 | 3/2022 | Ahn | |
| 2022/0100579 A1* | 3/2022 | Lal | G06F 9/5083 |
| 2022/0278855 A1* | 9/2022 | Jacquin | H04L 9/3247 |
| 2023/0076669 A1* | 3/2023 | Acharya | H04L 9/0816 |
| 2023/0198784 A1* | 6/2023 | Miller | H04L 63/0869 |
| | | | 713/151 |
| 2023/0403552 A1* | 12/2023 | Ishiguro | H04L 9/0866 |
| 2024/0007286 A1 | 1/2024 | Miyamoto et al. | |

FOREIGN PATENT DOCUMENTS

| | | |
|---|---|---|
| SG | 10201911787 Y | 1/2020 |
| WO | 2007067722 A2 | 6/2007 |
| WO | 2014082483 A1 | 6/2014 |
| WO | 2020243484 A1 | 12/2020 |

OTHER PUBLICATIONS

Scalas et al., Automotive Cybersecurity Foundations for Next-Ganaration Vehicles (Year: 2019).*
Liu et al., Computer Architectures for Autonomous Driving (Year: 2017).*
Ho, Secure Sensing Inputs for Autonomous Vehicles (Year: 2017).*
Chandra, Review of the Security of Backward-Compatible Automotive Inter-ECU Communication (Year: 2021).*
NPL Search History (Year: 2024).*
Eftekhari et al., Robust session key generation protocol for social internet of vehicles with enhanced security provision (Year: 2020).*

* cited by examiner

AUTONOMOUS VEHICLE SENSOR SECURITY, AUTHENTICATION AND SAFETY

RELATED APPLICATIONS

This application claims the benefit of U.S. Provisional Application 63/197,039 filed on Jun. 4, 2021, the entire contents of which are incorporated by reference herein.

TECHNICAL FIELD

The instant specification generally relates to autonomous vehicles. More specifically, the instant specification relates to autonomous vehicle sensor security, authentication and safety.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the driving environment based on the sensed data. The driving path can be determined based on Global Positioning System (GPS) data and road map data. While the GPS and the road map data can provide information about static aspects of the driving environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the driving environment and to provide correct instructions to the vehicle controls and the drivetrain.

SUMMARY

In one implementation, disclosed is a system. The system includes a sensing system including a sensor component. The sensor component includes a sensor, a sensor controller and a first cryptographic coprocessor. The sensing system further includes a data processing system. The data processing system includes a communication bus security block communicatively coupled to the first cryptographic coprocessor, a cryptographic key store, a hardware accelerator, and a second cryptographic coprocessor, operatively coupled to the cryptographic key store and the hardware accelerator, to perform first operations including sending, to the sensor component, a request to establish a session with the sensor component, determining whether the sensor component acknowledges the request, and in response to determining that the sensor component acknowledges the request, establishing the session with the sensor component.

In another implementation, disclosed is a method. The method includes sending, by a processing device to a sensor component of a sensing system of an autonomous vehicle (AV), a request to establish a session with the sensor component. The sensor component includes a sensor, a sensor controller and a first cryptographic coprocessor, and the processing device includes a second cryptographic coprocessor operatively coupled to a hardware accelerator. The method further includes determining, by the processing device, whether the sensor component acknowledges the request and, in response to determining that the sensor component acknowledges the request, establishing, by the processing device, the session with the sensor component.

In yet another implementation, disclosed is a non-transitory computer-readable storage medium. The non-transitory computer-readable storage medium has instructions stored thereon that, when executed by a processing device, cause the processing device to perform operations including sending, to a sensor component of a sensing system of an autonomous vehicle (AV), a request to establish a session with the sensor component. The sensor component includes a sensor, a sensor controller and a first cryptographic coprocessor, and the processing device includes a second cryptographic coprocessor operatively coupled to a hardware accelerator. The operations further include determining whether the sensor component acknowledges the request and, in response to determining that the sensor component acknowledges the request, establishing the session with the sensor component.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
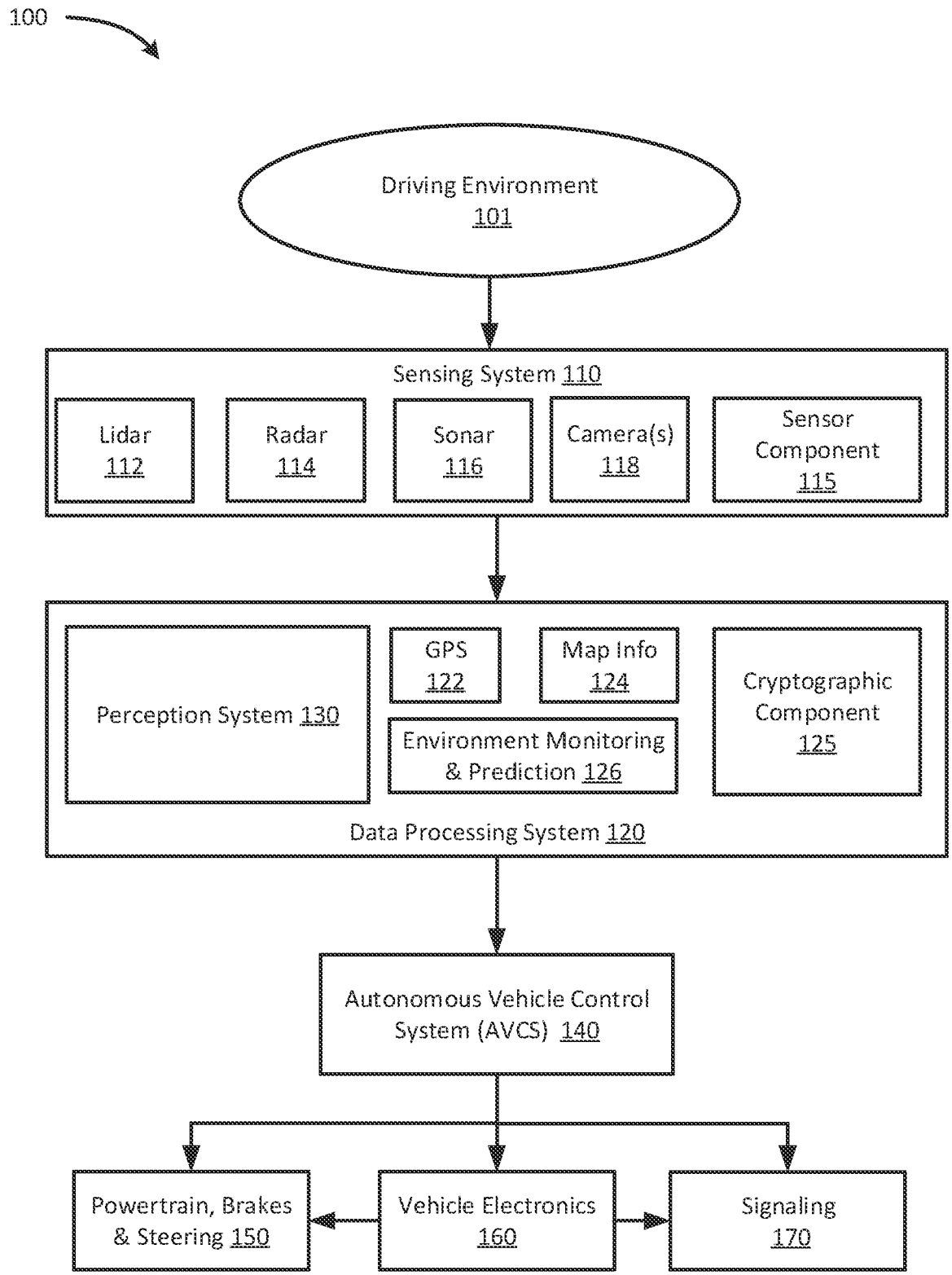
FIG. 1 is a diagram illustrating components of an example autonomous vehicle (AV), in accordance with some implementations of the present disclosure.

Sensors (e.g., environmental sensors) can be used to obtain inputs to autonomous vehicle (AV) perception systems, which can control safety-critical functions implemented by an AV control system (AVCS). One example of a safety-critical function is vehicle trajectory. One example of a sensor is an image sensor. An image sensor can include a number of light-sensing pixels that measure an intensity of incident light to collectively capture an image of an environment. A frame rate may be applied to the image sensor to allow the image sensor to generate images of the environment. Examples of image sensors include cameras, light detection and ranging (lidar) sensors, radar sensors, etc.

Since sensors can be used to control AV safety-critical functions, sensor security is becoming an increasingly important aspect to ensure safe AV operation and performance. However, sensor security has not been adequately addressed in a way that provides a most secure solution. For example, typical sensor security solutions do not address fundamental security concerns, especially when an adversary has physical access to a sensor in an AV system. Examples of AV systems include Transportation-as-a-Service (TaaS) vehicle systems. For example, an AV can be a multitenant AV, such as a multitenant public transportation vehicle or taxi.

Sensors used within AV systems can communicate over a communications bus ("bus"), such as a low-level serial bus. One example of a bus is a Mobile Industry Processor Interface (MIPI) bus. There can be a lack of hardware security with respect to sensors communicating over buses (e.g., at the printed circuit board (PCB) level). For example, low-power sensors can have their own cryptographic key storage and handling mechanisms, making them robust to physical attack and thus security incidents. Security incidents can include tampering with sensor data to cause a regression in vehicle safety, intellectual property theft through firmware extraction over an unprotected wiring harness, etc. Illustratively, a multitenant AV can be exposed to greater security threats than a single tenant AV (e.g., single consumer owned AV) due to increased physical access to potential attackers. Although a controller (e.g., microcontroller) sharing the same PCB assembly with a sensor can be authenticated, such authentication is typically not performed at the sensor-level, and the connection between the sensor and the controller can itself be left in an unprotected state and susceptible to attack. However, a lack of options exists in the automotive industry for protecting high-speed protocols at line rate, which refers to the actual rate at which bits are transmitted across a wire (e.g., gross bit rate).

Aspects of the disclosure address the above challenges, along with others, by implementing autonomous vehicle (AV) sensor security, authentication and safety. In some implementations, the AV is implemented as a multitenant AV (e.g., multitenant public transportation vehicle or multitenant taxi). For example, implementations described herein can provide for authentication and encryption of sensor processors of sensors (e.g., environmental sensors) used within AV systems. In some implementations, a sensor is an image sensor. Examples of image sensors include cameras, lidar sensors, radar sensors, etc. The sensor processor can be a low-power sensor and/or a special-purpose sensor with a small processor. Further, the sensor processor can be any suitable sensor in accordance with the implementations described herein.

For example, implementations described herein can provide a certificate-based key exchange to protect a communication bus ("bus"). The bus can be any bus that can be used to implement a high-speed sensor network. In some implementations, the bus is a MIPI bus. Illustratively, implementations described herein can be useful in networks which utilize low-power compute or special-purpose sensors having small processors.

In contrast to static key sensor security techniques that are typically utilized in the automotive space, implementations described herein can provide for end-to-end hardware-backed sensor processor security. For example, harness-level security can be provided by using a cryptographic protocol to protect the communications sent between a central computer and a sensor processor. The cryptographic protocol can implement certificate-based key exchanges to protect a bus that communicates with the sensor processor. In some implementations, the bus is a MIPI bus. The sensor processor can be authenticated by encrypting data starting from the sensor processor, and supporting a mutual authentication protocol (e.g., asymmetric authentication protocol) used to establish a secure channel and bidirectional trust between the sensor processor and a sensor validation component, as discussed in more detail below.

A system described herein can include a sensor component and a sensor validation component. The sensor component can be located in a sensing system of the AV, and the sensor validation component can be located within a data processing system of the AV. The sensor component can perform operations to verify the legitimacy of a sensor during and/or after sensor manufacturing/provisioning. The sensor validation component can itself verify the legitimacy of the sensor processor prior to incorporating the sensor with the AV system. Implementations described herein can pass authentication through to the sensor processor, which does not terminate in the sensor controller. That is, traffic (e.g., Internet Protocol (IP) traffic) can be translated into a suitable standard (e.g., MIPI standard) by the sensor controller, but the sensor processor is what is authenticated (not the sensor controller).

Aspects of the present disclosure can provide cryptographic assurances that: (1) a sensor processor executes trusted code; (2) the sensor processor is legitimate by performing sensor provisioning and/or sensor manufacturer attestation; and (3) data received or transmitted by the sensor processor is trusted (e.g., by providing end-to-end sensor processor data security).

With respect to (1), sensor processors typically do not implement any form of secure boot and code signing/verification framework that can be used to provide cryptographic assurances that a sensor processor executes trusted code. Implementations described herein provide a secure boot and code signing/verification framework that includes a number of features to provide these cryptographic assurances to support sensor processor authentication. Examples of features include: (1) immutable boot read-only memory (ROM); (2) a fused public key or hash value; (3) correctly signed updates; and/or (4) no mechanism to tamper with code resulting in time-of-us-time-of-check (TOUTOC) issues.

With respect to (2), sensor provisioning and/or sensor manufacturer attestation can be performed to ensure that the sensor processor is indeed legitimate. Sensor attestation can be used to attest the identity of a sensor processor before using the sensor within an AV system. For example, a sensor component can generate and store non-exportable cryptographic keys to perform certificate-based authentication. In some implementations, the sensor component further generates a Certificate Signing Request (CSR) for key attestation. Key attestation can be performed to prove the legitimacy of cryptographic keys generated by the sensor component (e.g., prove that the sensor component generated the cryptographic keys and that the cryptographic keys are non-exportable). To perform the key attestation, an attestation certificate can be signed by a trusted party with respect to ensuring the validity of the sensor processor, such as a sensor processor vendor (e.g., manufacturer). After sensor attestation and key attestation successfully prove the legitimacy of the sensor and the cryptographic keys generated by the sensor component, the sensor component can securely generate secrets. Additionally, the sensor component can pin certificates to establish a group of authorized peer devices with which the sensor is allowed to communicate. The sensor component can authenticate an authorized sensor validation component (e.g., located within the data processing system of the AV) using a suitable key agreement protocol for sharing a secret with the authorized peer over an insecure channel. The sensor component can support authenticated encryption of sensor data, validate firmware signatures before execution, and validate update signatures before installation and execution. Mutual authentication (e.g., asymmetric mutual authentication) can then be established.

With respect to (3), after the mutual authentication is established, a cryptographic coprocessor of the sensor component can generate cryptographically strong keys used to support authenticated encryption for sensor processor data. The authenticated encryption provides data confidentiality and integrity.

Aspects and implementations disclosed herein provide numerous advantages over existing technologies. For example, the implementations described herein can improve hardware security of sensor processors used within AV systems to prevent attacks. Therefore, implementations described herein can improve the security of data traffic to and from a sensor processor of an AV system.

FIG. 1 is a diagram illustrating components of an example autonomous vehicle (AV) 100, in accordance with some implementations of the present disclosure. FIG. 1 illustrates operations of the example autonomous vehicle.

Autonomous vehicles can include passenger and commercial motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. The disclosed techniques can be used in Level 3 driving assistance systems capable of autonomous driving under limited (e.g., highway) conditions. Likewise, the disclosed techniques can be used in vehicles that use Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems.

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the driving environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. The data processing system 120 can further include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the driving environment 101 and velocities (radial and, in some implementations, transverse, as described below) of such objects. In some implementations, the perception system 130 can use radar data in combination with the data captured by the camera(s) 118, as described in more detail below.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, (e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include a driving environment monitoring and prediction component 126, which can monitor how the driving environment 101 evolves with time, e.g., by keeping track of the locations and velocities of the animated objects (e.g., relative to Earth). In some implementations, the driving environment monitoring and prediction component 126 can keep track of the changing appearance of the driving environment due to a motion of the AV relative to the driving environment. In some implementations, the driving environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the driving environment monitoring and prediction component 126 can conclude that object 1 is resuming its motion from a stop sign or a red traffic light signal. Accordingly, the driving environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the driving environment monitoring and prediction component 126 can conclude that object 2 is stopping at a stop sign or at a red traffic light signal. Accordingly, the driving environment monitoring and prediction component 126 can predict where object 2 is likely to be within the next 1 or 3 seconds. The driving environment monitoring and prediction component 126 can perform periodic checks of the accuracy of its predictions and modify the predictions based on new data obtained from the sensing system 110. The driving environment monitoring and prediction component 126 can operate in conjunction with default corridor component 132.

The data generated by the perception system 130, the GPS data processing module 122, and the driving environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, radar 114, and/or lidar 112 can determine that the path ahead (e.g., a current driving lane) is hindered by one or more road primitives (e.g., cones or traffic signs). The AVCS 140 can cause the AV 100 to alter a driving path (e.g., change lanes) based on the detected one or more road primitives (e.g., identifying a spatial relationship between the road primitives, detecting displayed navigational instructions associated with the road primitives). The AVCS 140 can then output instructions to powertrain, brakes and steering 150 to route the AV through a temporary travel path (e.g., a detour) and return the AV to an original driving path after determining the status of the associated lane has returned to a previous state (e.g., a normal or active lane state). Based on this determination, the AVCS 140 can output instructions to the powertrain, brakes and steering 150 to drive around the candidate object. The data processing system 120 may provide data used to predict the behavior of objects (e.g., vehicles, pedestrians, etc.) in the driving environment of the AV. The AVCS 140 may alter driving behavior of the AV responsive to data indicating future states of objects within the driving environments. The data processing system 120 may detect a construction zone and detect that an oncoming lane shifts or merges into the current lane of the AV. The data processing system 120 may communicate to the AV to choose to yield or nudge accordingly based on the object detection (e.g., oncoming vehicles). For example, the data processing system 120 may determine that a two-way road with two lanes in each direction has a construction zone in which the oncoming traffic lanes are closed and one of the lanes of traffic in the direction of the AV's motion is provided for the oncoming traffic. Data processing system 120 can determine that the left lane currently occupied by the AV is to be used by the oncoming traffic within a certain driving distance. Using the output of the data processing system 120, the AVCS 140 can alter a driving path of the AV by causing the AV to move to the right lane.

The sensing system 110 can further include a sensor component 115. As will be described in further detail below with reference to FIG. 2, the sensor component 115 can include a a sensor, a sensor controller, and a cryptographic coprocessor. The sensor can be operatively coupled to an image capturing device (e.g., included with the image capturing device). The sensor can be an environmental sensor (e.g., image sensor). For example, the sensor can be a lidar sensor, a radar sensor, a sonar sensor, a camera sensor, etc. The cryptographic coprocessor can be used to cryptographically secure the sensor component 115 and generate cryptographic material (e.g., cryptographic keys) used to validate the legitimacy of the sensor component 115 (e.g., the sensor controller). The cryptographic coprocessor can implement one or more security mechanisms that provide resistance from attacks (e.g., tampering), including attacks by malicious software. Prior to being implemented within the AV 100, sensor attestation and attestation verification can be performed to ensure the authenticity and legitimacy of the sensor component 115 (e.g., the sensor processor).

The data processing system 120 can further include a sensor validation component 125. As will be described in further detail below with reference to FIG. 2, the sensor component 115 and the sensor validation component 125 can be communicatively coupled with a harness. Although the sensor validation component 125 is shown as being a component of the data processing system 120, the sensor validation component 125 can be a standalone component, or can be included in another system of the AV 100.

As will be described in further detail below with reference to FIG. 2, the sensor validation component 125 can include a communication bus ("bus") security block (e.g., MIPI security block), a cryptographic coprocessor and a key store. The sensor validation component 125 can validate the authenticity of the sensor component 115. For example, the sensor validation component 125 can establish a session with the sensor component 115.

Figure 2:
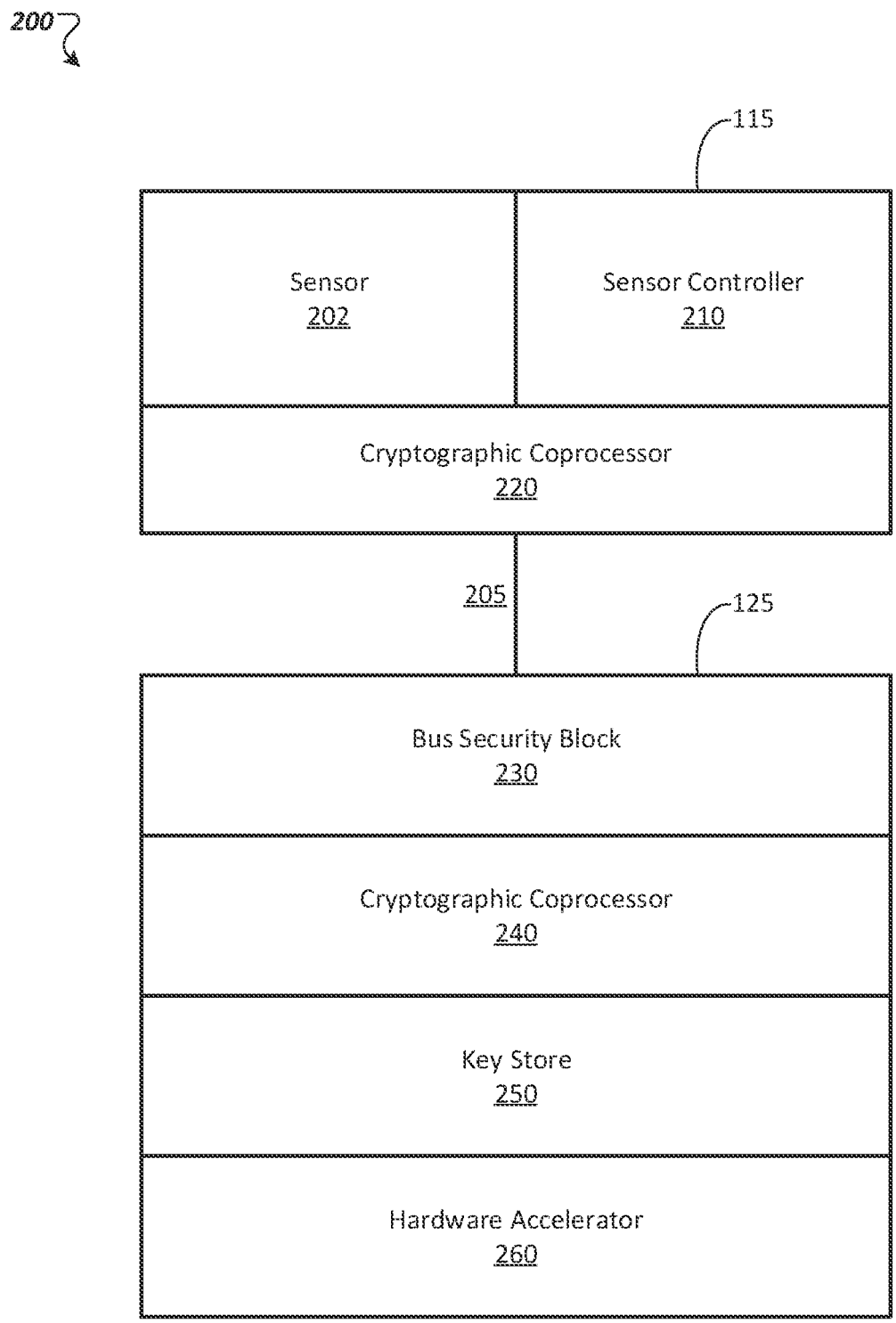
FIG. 2 is a diagram illustrating an example system for implementing autonomous vehicle (AV) sensor security, authentication and safety, in accordance with some implementations of the present disclosure.

FIG. 2 is a diagram illustrating an example system 200 for implementing default autonomous vehicle (AV) sensor security, authentication and safety, in accordance with some implementations of the present disclosure. The system 200 can be used to prevent or eliminate the risk of security incidents during AV operation (e.g., data tampering or theft through an unprotected wiring harness ("harness") 205). In some implementations, the system 200 is a multitenant sensor processor security, authentication and safety system for use within a multitenant AV designed for transporting multiple passengers (e.g., multitenant public transportation vehicle or multitenant taxi).

As shown in FIG. 2, the system 200 can include the sensor component 115 and the sensor validation component 125 described above with reference to FIG. 1. For example, the sensor component 115 can include a sensor 202, a sensor controller 210 and a cryptographic coprocessor 220. In some embodiments, the sensor 202 is an environmental sensor of the AV 100. For example, the sensor 202 can be a lidar sensor, a radar sensor, a sonar sensor, a camera sensor, etc. The sensor validation component 125 can include a communication bus ("bus") security block 230, a cryptographic coprocessor 240, a key store 250 and a hardware accelerator 260. In some embodiments, the bus security block 230 is a MIPI security block.

The cryptographic coprocessors 220 and 240 can be secure crypto-processors that perform cryptographic operations. For example, the cryptographic coprocessors 220 and 240 can each implement one or more security mechanisms that provide resistance from attacks (e.g., tampering), including attacks by malicious software. In some implementations, at least one of the cryptographic coprocessors 220 or 240 is a Trusted Platform Module (TPM) having a TPM chip. The key store 250 can be included within a cryptographically secure computing device. For example, the key store 250 can be included within a hardware security module (HSM).

The sensor component 115 is communicatively coupled to the sensor validation component 125 via a harness 205. The harness 250 can be a wired connection between sensor component 115 and the sensor validation component 125. For example, as shown, the harness 205 can link the cryptographic coprocessor to the bus security block 230.

A number of sensor validation processes can be performed to ensure the authenticity and legitimacy of the sensor component 115 (e.g., the sensor controller 210) prior to establishing secure communication sessions between the sensor component 115 (e.g., sensor 202) and the data processing component 120.

A first sensor validation process can be sensor attestation. Sensor attestation can be performed by the sensor vendor during provisioning and/or manufacturing of the sensor component 115 to attest to the identity of the sensor component 115 before implementation in an AV (e.g., the AV 100 of FIG. 1). In addition, the sensor attestation can "personalize" the sensor component 115 with a particular identifier for the sensor validation component 125. Further details regarding performing sensor attestation will be described below with reference to FIG. 3.

A second sensor validation process can be attestation validation. Attestation validation can be performed to validate the result of the sensor attestation. For example, the sensor vendor can provide the sensor component 115 to an attestation validator to perform the attestation validation. In some embodiments, the attestation validator is an AV vendor. If the attestation validation is successful, then the attestation validator can grant an attestation validator key to the sensor component 115, and the sensor component 115 can be implemented within the AV. Further details regarding performing attestation validation, including the process of granting the attestation validator key, will be described below with reference to FIG. 4.

Due to physical access constraints of an AV, there may be concerns about physical access to unsupervised hardware. Examples of concerns include malicious implants, sniffing bus traffic, etc. To mitigate these concerns, a third sensor validation process can be performed to implement end-to-end hardware-backed security to protect cryptographic key content from being exposed outside of the chip by an attacker with physical or software-level access to the sensor component 115. Performing the third sensor validation process can include the sensor validation component 125 establishing a secure sensor session with sensor component 115. For example, the sensor validation component 125 (e.g., cryptographic coprocessor 240) can send a request to the sensor component 115 (e.g., cryptographic coprocessor 220) to initiate a connection. Upon acknowledging the request, the sensor validation component 125 can initiate a secure key exchange. After performing the secure key exchange, the sensor component 115 and the sensor validation component 125 can each generate a unique session key for establishing the secure sensor session. The hardware accelerator 260 can implement hardware acceleration for ensuring the security of the bus connection during the third sensor validation process. For example, the hardware accelerator 260 can perform a number of different cryptographic operations in hardware. Further details regarding session key generation and establishing a secure sensor session are described below with reference to FIG. 5.

Figure 3:
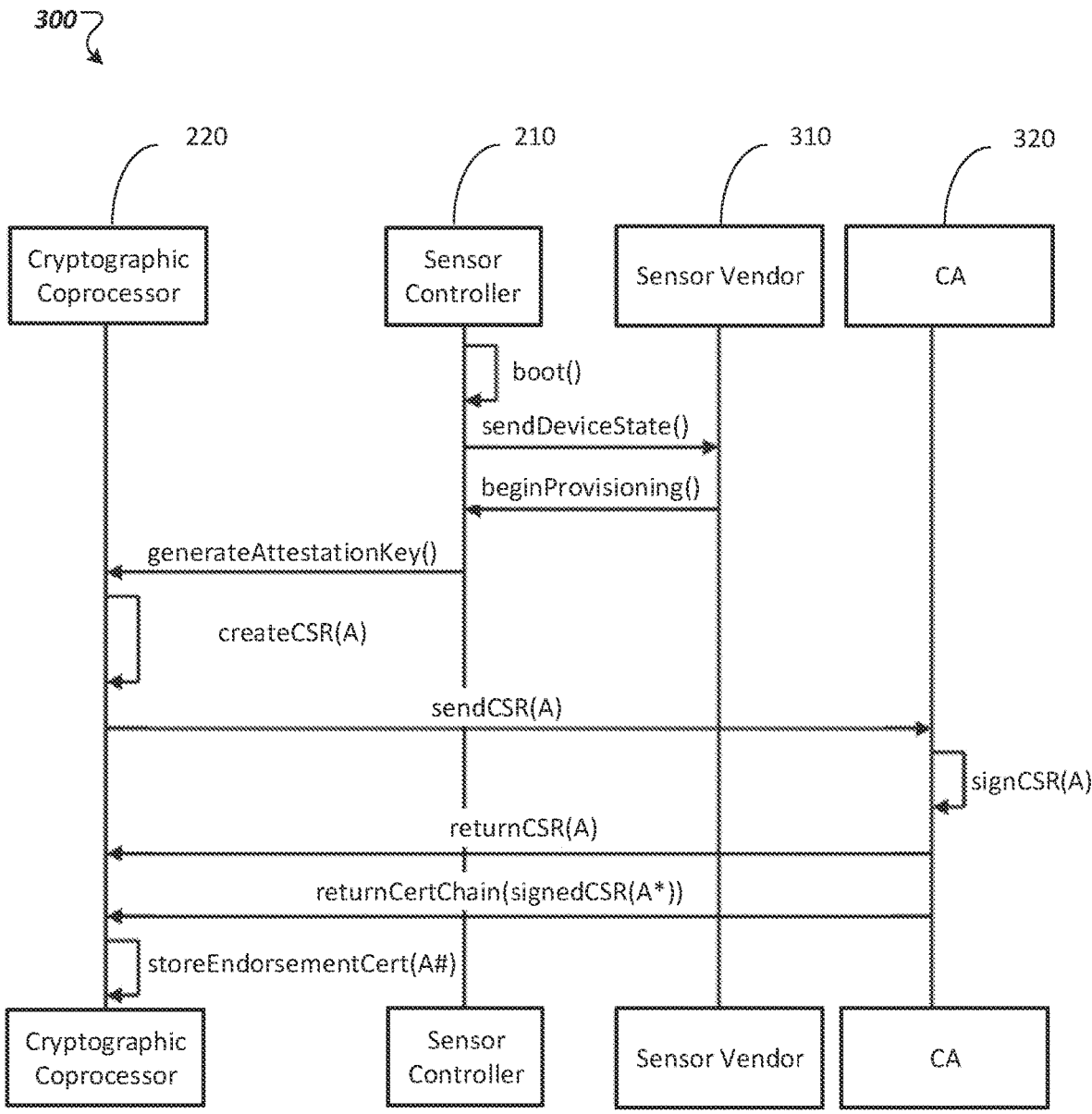
FIG. 3 is a timing diagram illustrating example responses and replies between components of a system performing autonomous vehicle (AV) sensor attestation, in accordance with some implementations of the present disclosure.

FIG. 3 is a timing diagram 300 illustrating example responses and replies between components of a system performing sensor attestation, in accordance with some implementations of the present disclosure. The diagram 300 includes the sensor controller 210 and the cryptographic coprocessor 220 described above with reference to FIG. 2.

As shown, after the sensor controller 210 boots (e.g., "boot( )"), the sensor controller 210 causes a device state to be sent to a sensor vendor 310 (e.g., "sendDeviceState( )"). The device state can include an initial provisioning state of the device. For example, the device state can indicate whether the corresponding sensor component has an attestation key.

Upon receiving the device state, the sensor vendor 310 can initialize sensor provisioning by sending a request or command to the sensor controller 210 to begin sensor provisioning (e.g., "beginProvisioning( )"). Upon receiving the request to begin sensor provisioning, the sensor controller 210 can cause the cryptographic coprocessor 220 to generate an attestation key (e.g., "generateAttestationKey( )"), illustratively denoted "A".

Upon receiving the request to generate the attestation key, the cryptographic coprocessor 220 can generate the attestation key. At least a portion of the attestation key can be used to assign a "production identity" to the device. For example, the attestation key can be generated as an asymmetric encryption key pair having a public key and a private key. As another example, the attestation key can be a symmetric key. Performing sensor attestation can further include at least one of: (1) triggering a routine to cause the cryptographic coprocessor 220 to generate a Certificate Signing Request (CSR) using the attestation key, or (2) securely transmitting the public key to an AV vendor using an out-of-band mechanism (e.g., secure file transfer).

In this illustrative example, the cryptographic coprocessor 220 generates a CSR using the attestation key, illustratively denoted "CSR(A)" (e.g., "createCSR(A)"). In some implementations, generating the CSR can include signing random bytes of nonce data with the attestation key. The signed random bytes of nonce data can be used to prove that that the sensor component has the attestation key. Additionally or alternatively, in some implementations, the cryptographic coprocessor 220 securely transmits at least a portion of the attestation key to a sensor validation component (e.g., the sensor validation component 125) (not shown). For example, the cryptographic coprocessor 220 can securely transmit the public key of the attestation key. The transmission can be made using an out-of-band mechanism (e.g., secure file transfer).

After generating the CSR message, the cryptographic coprocessor 220 can send the CSR to a certificate authority (CA) 320 to confirm the validity of the CSR. The CA 320 can be associated with an AV vendor that desires to integrate the sensor component within an AV. If the CSR is determined to be valid, then the CA 320 can sign the CSR (e.g., "signCSR(A)") to generate a signed CSR. For example, the CA 320 can sign the CSR with a public portion of the attestation key, denoted A*, referred to in FIG. 3 as "signedCSR(A*)". The CA 320 can return the CSR message (e.g., "returnCSR(A)) and return a certificate chain to the cryptographic coprocessor 220 (e.g., "returnCertChain (signedCSR(A*))"). For example, the certificate chain can include a hierarchy of all certificate authorities that have performed certification certified by another CA key, where the certificate chain terminates at a root certificate.

The cryptographic coprocessor 220 can generate an endorsement certificate storing a private portion of the attestation key, denoted A #illustratively denoted "EndorsementCert(A #)", and securely store the endorsement certificate (e.g., "storeEndorsementCert(A #)") on the cryptographic coprocessor 220. The endorsement certificate can be used to identify the cryptographic coprocessor 220 as a valid cryptographic coprocessor provided by (e.g., manufactured by) the sensor vendor 310. Thus, an endorsement key can be trusted assuming that the endorsement certificate remains cryptographically stored (e.g., within an HSM).

Figure 4:
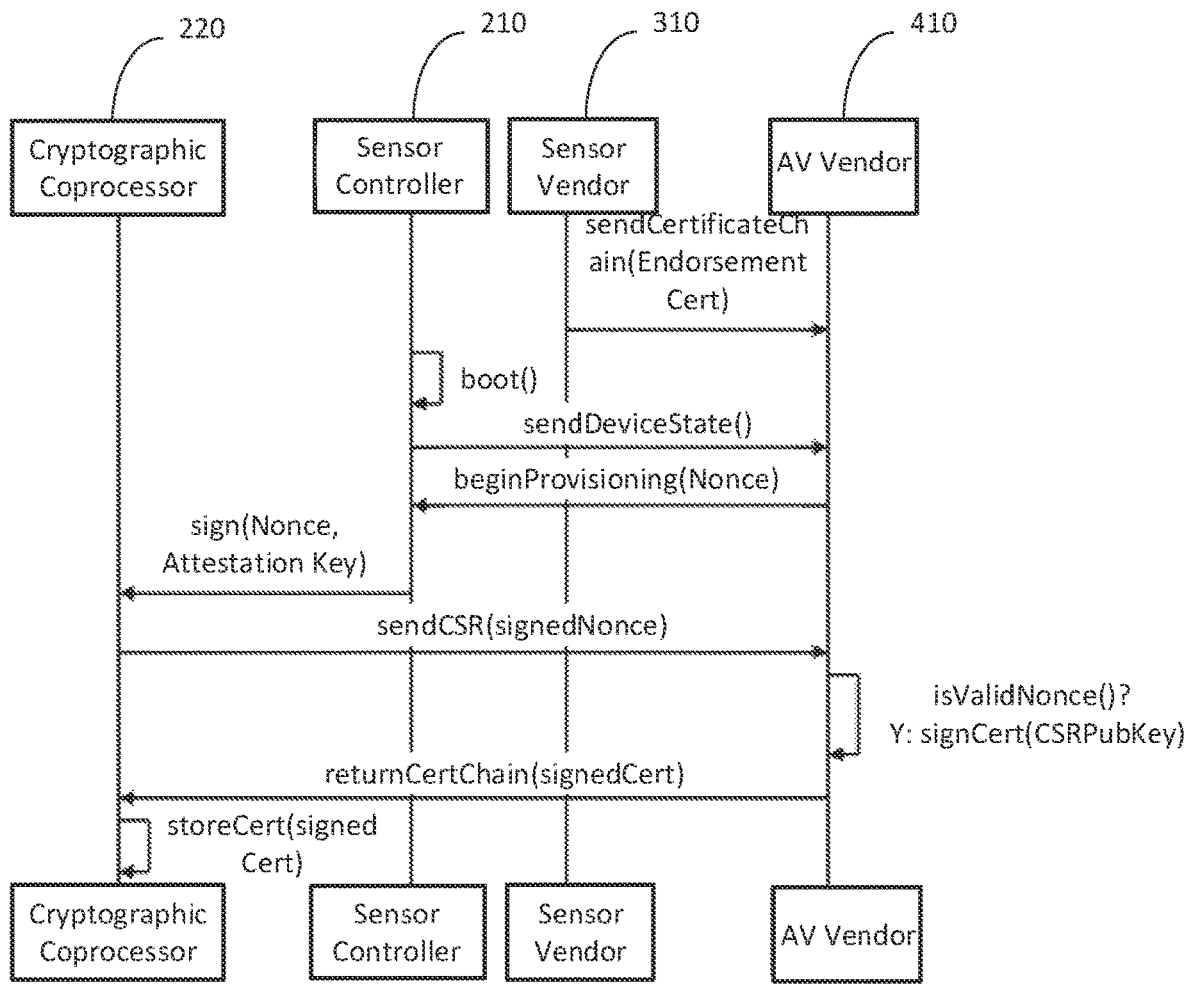
FIG. 4 is a timing diagram illustrating example responses and replies between components of a system performing autonomous vehicle (AV) attestation validation, in accordance with some implementations of the present disclosure.

FIG. 4 is a timing diagram 400 illustrating example responses and replies between components of a system performing autonomous vehicle (AV) attestation validation, in accordance with some implementations of the present disclosure. The diagram 400 includes the sensor controller 210 and the cryptographic coprocessor 220 described above with reference to FIGS. 2-3, the sensor vendor 310 described above with reference to FIG. 3, and an AV vendor 410. As will be described in further detail, the AV vendor 410 acts as an attestation validator.

The sensor vendor 310 can send at least the endorsement certificate to the AV vendor 410. In some embodiments, and as shown, the sensor vendor 310 can send the certificate chain (e.g., the certificate chain described above with reference to FIG. 3) with the endorsement certificate to the AV vendor 410 (e.g., "sendCertificateChain(Endorsement Issuing Cert)"). After the sensor controller 210 boots (e.g., "boot( )"), the sensor controller 210 sends a device state to the AV vendor 410 (e.g., "sendDeviceState( )"). Upon receiving the device state, the AV vendor 410 can initialize sensor provisioning by sending a command to the sensor controller 210 to begin sensor provisioning with nonce data (e.g., "beginProvisioning (Nonce)"). Upon receiving the command to begin sensor provisioning with nonce data, the sensor controller 210 can send a command to the cryptographic coprocessor 220 to sign the nonce data and the attestation key that was generated as described above with reference to FIG. 3 (e.g., "sign (Nonce, Attestation Key)"). The signed nonce data is referred to in FIG. 4 as "signedNonce". The cryptographic coprocessor 220 can generate and send a CSR with the signed nonce data to the AV vendor 410 (e.g., "sendCSR(signedNonce)").

The AV vendor 410 can determine whether the nonce data, which was initially provisioned onto the sensor component, is valid (e.g., "isValidNonce( )"). If not, this means that the sensor component is invalid, and the attestation validation fails and the process ends. If the nonce data is valid, this means that sensor component is valid. Thus, upon determining that the nonce data is valid, the AV vendor 410 can generate a signed certificate (e.g., "signedCert"), using the CSR public key (e.g., "signCert(CSRPubKey)"). The AV vendor 410 can return at least the signed certificate to the cryptographic coprocessor 220. In some embodiments, and as shown, the AV vendor 410 can return the certificate chain to the cryptographic coprocessor 220 with the signed certificate (e.g., "returnCertChain(signedCert)"). The cryptographic coprocessor 220 can securely store the signed certificate (e.g., "storeCert(signedCert)").

Figure 5:
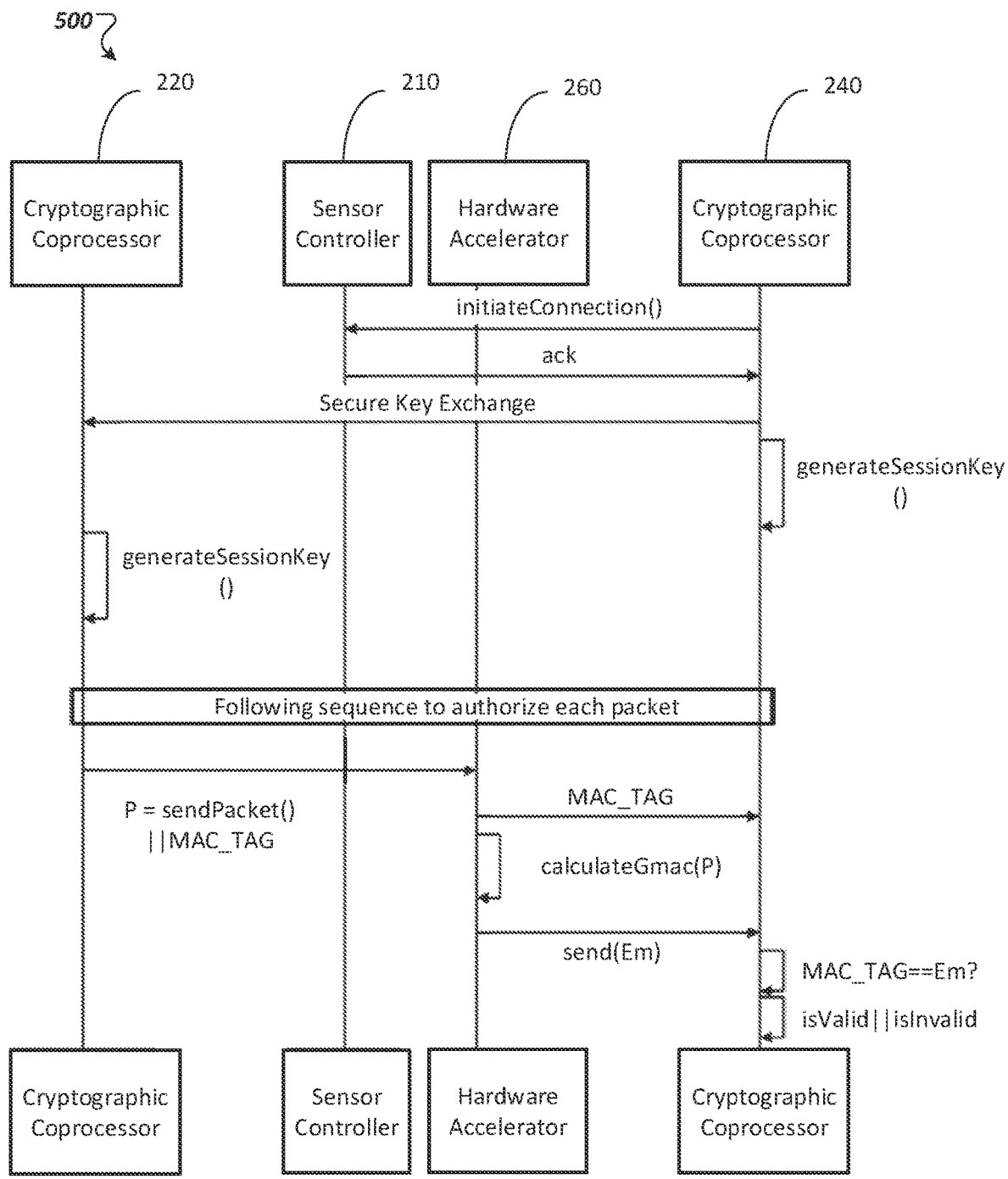
FIG. 5 is a timing diagram illustrating example message responses and replies between components of a system establishing a secure autonomous vehicle (AV) sensor session, in accordance with some implementations of the present disclosure.

FIG. 5 is a timing diagram 500 illustrating example message responses and replies between components of a system establishing a secure autonomous vehicle (AV) sensor session, in accordance with some implementations of the present disclosure. The diagram 500 includes the sensor controller 210, the cryptographic coprocessors 220 and 240 and the hardware accelerator 260 described above with reference to FIGS. 1-4.

As shown, cryptographic coprocessor 240 can send a request to the sensor controller 210 to initiate a connection with the sensor controller 210 (e.g., "initiateConnection( )"). Upon receiving the request, the sensor controller 210 can send an acknowledgment to the cryptographic coprocessor 240 can (e.g., "ack"). Upon receiving the acknowledgment, cryptographic coprocessor 240 can perform secure key exchange with the cryptographic coprocessor 220. Performing the secure key exchange can include using a digital signature algorithm (DSA). In some implementations, the secure key exchange is performed using an Elliptic Curve DSA (ECDSA). The cryptographic coprocessor 220 and the cryptographic coprocessor 240 can each generate a unique session key (e.g., "generateSessionKey( )"), which establishes the session.

The session key can be generated using a key derivation function. A key derivation function is a cryptographic method that uses a pseudorandom function to derive a secret key (e.g., the session key) from a secret value. Examples of pseudorandom functions include cryptographic hash functions and block ciphers. Sensors can have real-time constraints which impose practical limitations on what can be done at a hardware level to protect traffic. For example, if a sensor operates at 16 gigabits per second, cryptographic functions should be performed at this rate. Thus, cryptographic algorithms for session key generation should be chosen for operation at these speeds. For example, the key derivation function can be a message authentication code (MAC)-based key derivation function. In some implementations, the key derivation function is a hash-based MAC (HMAC) key derivation function (HKDF). An HKDF can derive a secret key using an HMAC hash function. For example, the secret key can be a master key that can be used to generate the session key.

In some implementations, the session key is an Advanced Encryption Standard (AES)-based session key. For example, the session key can be a Galois/Counter Mode AES (AES-CSM), a Galois Message Authentication Code (GMAC) AES (AES-GMAC), etc. The session key can be rotated depending on bandwidth. Due to the possibility of Initialization Vector (IV) reuse attacks, which can be observed in, e.g., AES-GMAC, the IV can be extended to avoid key rotation, or encrypted to prevent an attacker from using captured IVs to extract key contents. For example, the IV can be encrypted with Electronic Code Book mode AES (AES-ECB).

The hardware accelerator 260 can implement hardware acceleration for ensuring the security of the communication bus ("bus") connection. For example, the hardware accelerator 260 can facilitate a packet authorization sequence to determine whether the cryptographic coprocessor 220 is sending valid packets across the bus (e.g., MIPI bus).

For example, the cryptographic coprocessor 220 can send, to the hardware accelerator 260, a message P including a packet and/or a tag. A tag is a piece of information that can be used to authenticate or validate a message. In this example, the tag is a message authentication code ("MAC_TAG") ("P=sendPacket( )||MAC_TAG"). The hardware accelerator 260 can send the MAC_TAG to the cryptographic coprocessor 240 and can calculate an expected tag or MAC ("Em") using the packet (e.g., "calculateGmac(P) "). The hardware accelerator 260 can perform a number of different cryptographic operations in hardware to calculate the expected tag. For example, the hardware accelerator 260 can perform AES-GMAC authentication by performing multiple GHash( ) operations and/or multiple Gmul$_H$( ) operations.

The hardware accelerator 260 can send the expected tag to the cryptographic coprocessor 240. The cryptographic coprocessor 240 can then compare the MAC_TAG with the expected tag ("MAC_TAG==Em?") to determine whether the packet is valid or invalid ("isValid||isInvalid"). If the packet is valid (e.g., the MAC_TAG matches the expected tag), then the cryptographic coprocessor 220 (and thus the corresponding sensor component) is still valid. If the packet is invalid (e.g., the MAC_TAG does not match the expected tag), then the cryptographic coprocessor 220 (and thus the corresponding sensor component) is now invalid. If the sensor component is determined to be invalid, the sensor component can be assumed to be compromised and cannot be trusted.

Figure 6:
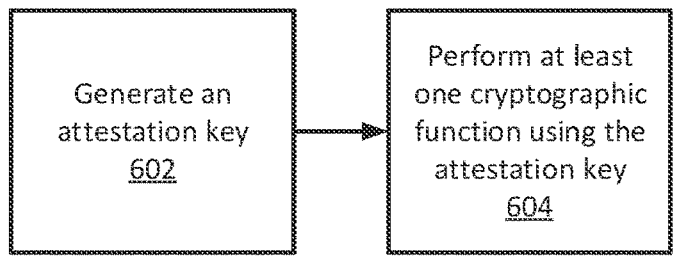
FIG. 6 is a flow diagram illustrating an example method for performing autonomous vehicle (AV) sensor attestation, in accordance with some implementations of the present disclosure.

FIG. 6 is a flow diagram illustrating an example method 600 for performing autonomous vehicle (AV) sensor attestation, according to some implementations. A processing device, having one or more processing units (CPUs), and or graphics processing units (GPU), telematics control units (TCUs), and memory devices communicatively coupled to the CPU(s) and/or GPUs, can perform method 600 and/or each of its individual functions, routines, subroutines, or operations. The processing device executing method 600 can perform instructions issued by various components, e.g., sensor component 115. Method 600 can be used to improve sensor processor security, authentication and safety. In certain implementations, a single processing thread can perform method 600. Alternatively, two or more processing threads can perform method 600, each thread executing one or more individual functions, routines, subroutines, or operations of the methods. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Various operations of method 600 can be performed in a different order compared with the order shown in FIG. 6. Some operations of method 600 can be performed concurrently with other operations. Some operations can be optional.

At operation 602, processing logic generates an attestation key. Generating the attestation key can include triggering a routine to generate the attestation key. The routine can include causing a sensor processor of a sensor component to send a device state to a sensor vendor, receiving a request from the sensor vendor to initiate sensor provisioning, and causing a cryptographic coprocessor of the sensor component to generate the attestation key in response to receiving the request from the sensor processor vendor. The attestation key can be an asymmetric key pair including a private key and a public key.

At operation 604, the processing logic performs at least one cryptographic function using the attestation key. In some implementations, performing the at least one cryptographic function includes generating a Certificate Signing Request (CSR) message using the attestation key, and sending the CSR message to a certificate authority associated with the sensor vendor. If the certificate authority determines that the sensor processor is valid based on the CSR message, the certificate authority can sign the CSR message. The processing logic can receive a confirmation message based on the signed CSR message. For example, the confirmation message can include a certificate chain. The processing logic can then generate and store a corresponding endorsement certificate.

Additionally or alternatively, in some implementations, performing the at least one cryptographic function includes transmitting the public key to a sensor validation component associated with an AV system that intends to implement the sensor processor. For example, the processing logic can transmit the public key to the sensor validation component using an out-of-band mechanism (e.g., secure file transfer). Further details regarding operations 602 and 604 are described above with reference to FIGS. 1-3.

Figure 7:
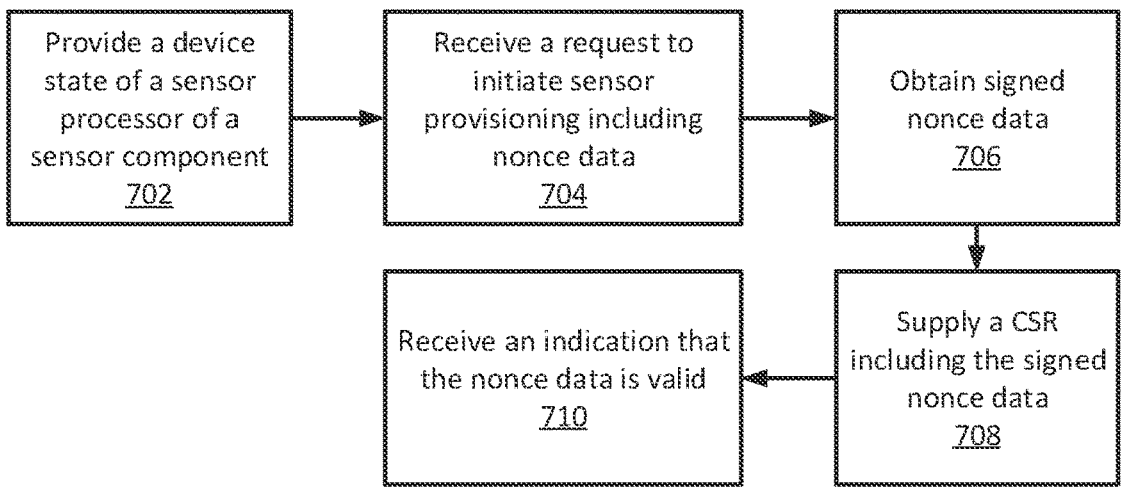
FIG. 7 is a flow diagram illustrating an example method for performing autonomous vehicle (AV) attestation validation, in accordance with some implementations of the present disclosure.

FIG. 7 is a flow diagram illustrating an example method 700 for performing autonomous vehicle (AV) attestation validation, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 700 and/or each of its individual functions, routines, subroutines, or operations. The processing device executing method 700 can perform instructions issued by various components, e.g., sensor component 115. Method 700 can be directed to systems and components of an autonomous driving vehicle, such as the autonomous vehicle 100 of FIG. 1. Method 700 can be used to improve sensor processor security, authentication and safety. In certain implementations, a single processing thread can perform method 700. Alternatively, two or more processing threads can perform method 700, each thread executing one or more individual functions, routines, subroutines, or operations of the methods. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. Various operations of method 700 can be performed in a different order compared with the order shown in FIG. 7. Some operations of method 700 can be performed concurrently with other operations. Some operations can be optional.

At operation 702, processing logic provides a device state of a sensor processor of a sensor component. For example, providing the device state can include causing the sensor processor to send the device state to an attestation validator. The attestation validator can be an entity associated with the AV (e.g., an AV vendor).

At operation 704, the processing logic receives a request to initiate sensor provisioning including nonce data. For example, the request can be received from the attestation validator by the sensor processor.

At operation 706, the processing logic obtains signed nonce data. For example, obtaining the signed nonce data can include causing the sensor processor to sign the nonce data using an attestation key, and sending the signed nonce data to a cryptographic coprocessor of the sensor component. The attestation key can be generated by the method described above with reference to FIG. 6.

At operation 708, the processing logic supplies a Certificate Signing Request (CSR) including the signed nonce data. Supplying the CSR request including the signed nonce data can include causing the cryptographic coprocessor to generate the CSR including the signed nonce data, and send the CSR including the signed nonce data to a certificate authority associated with the attestation validator to validate the nonce data.

If the nonce data is determined to be valid, at operation 710, the processing logic receives an indication that the nonce data is valid. For example, the cryptographic coprocessor can receive and store the indication. The indication can include a signed certificate provided the certificate authority. In some implementations, the indication includes a certificate chain. Further details regarding operations 702-710 are described above with reference to FIGS. 1, 2 and 4.

Figure 8:
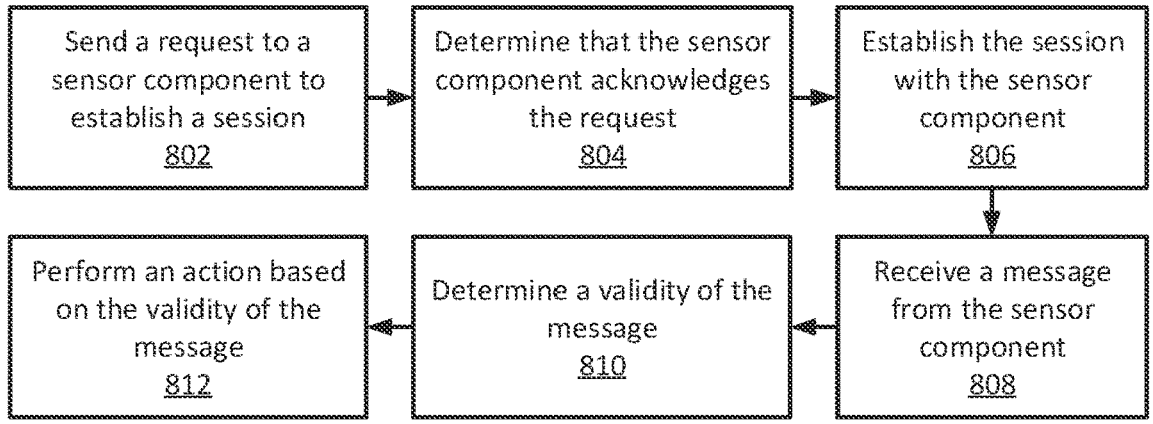
FIG. 8 is a flow diagram illustrating an example method for establishing a secure autonomous vehicle (AV) sensor session, in accordance with some implementations of the present disclosure.

FIG. 8 is a flow diagram illustrating an example method 800 for establishing a secure autonomous vehicle (AV) sensor session, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 800 and/or each of its individual functions, routines, subroutines, or operations. The processing device executing method 800 can perform instructions issued by e.g., sensor validation component 125. Method 800 can be used to improve sensor processor security, authentication and safety. In certain implementations, a single processing thread can perform method 800. Alternatively, two or more processing threads can perform method 800, each thread executing one or more individual functions, routines, subroutines, or operations of the methods. In an illustrative example, the processing threads implementing method 800 can be synchronized (e.g., using semaphores, critical sections, and/or other thread synchronization mechanisms). Alternatively, the processing threads implementing method 800 can be executed asynchronously with respect to each other. Various operations of method 800 can be performed in a different order compared with the order shown in FIG. 8. Some operations of method 800 can be performed concurrently with other operations. Some operations can be optional.

At operation 802, processing logic sends a request to a sensor component to establish a session. Initiating the session can include sending, to a sensor processor of the sensor component, a request to initiate connection.

At operation 804, processing logic determines that the sensor component acknowledges the request. Determining that the sensor component acknowledges the request can include receiving an acknowledgment message from the sensor processor. If the sensor component does not acknowledge the request, then the processing logic will not proceed with establishing the session with the sensor component. The request can time out in response to at least one condition. For example, the at least one condition can include a temporal condition in which the request times out upon failing to receive an acknowledgement within a threshold amount of time from sending the request.

At operation 806, in response to determining that the sensor component acknowledges the request (e.g., within the threshold amount of time), the processing logic establishes the session with the sensor component. Establishing the session with the sensor component can include sending a secure key exchange message, and generating a session key in response to receiving the secure key exchange message. The sensor component can independently generate the same session key.

At operation 808, processing logic can receive a message from the sensor component. For example, the packet data can include a packet and a tag. In some embodiments, the tag includes a message authentication code (MAC). The packet data can be received by a hardware accelerator.

At operation 810, processing logic can determine a validity of the message. For example, processing logic within the hardware accelerator can calculate an estimated tag (e.g., estimated MAC) using the message. Processing logic within a cryptographic coprocessor can compare the tag to the estimated tag to determine whether the message is valid. For example, if the tag is the same as the estimated tag, then the message is determined to be valid. Otherwise, if the tag is different from the estimated tag, then the message is determined to be invalid.

At operation 812, processing logic can perform an action based on the validity of the message. For example, if the message is determined to be invalid, then the sensor component can be determined to be compromised and cannot be trusted. Thus, processing logic can stop obtaining sensor data from the sensor component. Otherwise, if the message is determined to be valid, then the sensor component has been authenticated and is deemed trustworthy for continued use within the AV. Further details regarding operations 802-806 are described above with reference to FIGS. 1, 2 and 5.

Figure 9:
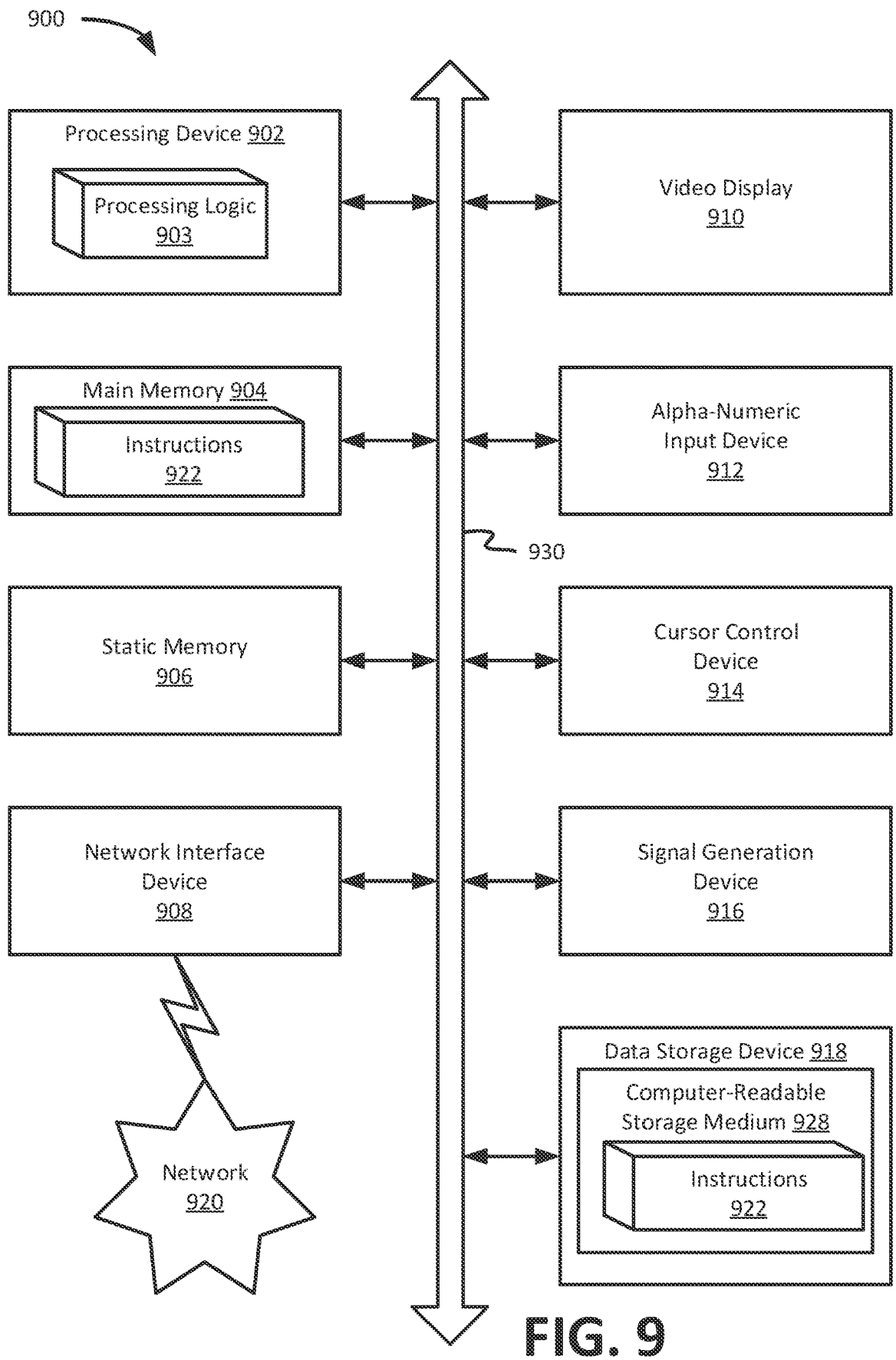
FIG. 9 is a block diagram of an example computer device within which a set of instructions, for causing the machine to perform any of the one or more methodologies discussed herein can be executed, in accordance with some implementations of the disclosure.

FIG. 9 depicts a block diagram of an example computer device 900 within which a set of instructions, for causing the machine to perform any of the one or more methodologies discussed herein can be executed, in accordance with some implementations of the disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the AV 100 includes the computer device 900.

The computer device 900 can include a processing device 902 (also referred to as a processor or CPU), which can include processing logic 903, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 902 can be configured to execute instructions performing any of the operations performed by the AV 100, sensor component 115, sensor validation component 125, etc.

Example computer device 900 can further comprise a network interface device 908, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the disclosure, executable instructions 922 can comprise executable instructions to perform any of the operations of AV 100, sensor component 115, sensor validation component 125, etc.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "obtaining," "sending," and "causing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation," "one implementation," "some implementations," "an implementation," "one implementation," "some implementations," or the like throughout may or may not mean the same implementation or implementation. One or more implementations or implementations described herein may be combined in a particular implementation or implementation. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. An autonomous vehicle (AV) system comprising:
 a sensing system of a multi-tenant AV, the sensing system comprising a sensor component, wherein the sensor component comprises a sensor, a sensor controller and a first cryptographic coprocessor; and
 a data processing system of the multi-tenant AV, the data processing system comprising:
  a communication bus security block communicatively coupled to the first cryptographic coprocessor;
  a cryptographic key store;
  a hardware accelerator; and
  a second cryptographic coprocessor, operatively coupled to the cryptographic key store and the hardware accelerator, to perform first operations comprising:
  sending, to the sensor component of the sensing system of the multi-tenant AV, a request to establish a session with the sensor component of the sensing system of the multi-tenant AV;
  determining whether the sensor component of the sensing system of the multi-tenant AV acknowledges the request; and
  in response to determining that the sensor component of the sensing system of the multi-tenant AV acknowledges the request, establishing the session with the sensor component of the sensing system of the multi-tenant AV using a first session key generated by the second cryptographic coprocessor and a second session key generated by the first cryptographic coprocessor of the sensing system of the multi-tenant AV.

2. The system of claim 1, wherein establishing the session with the sensor component comprises sending a secure key exchange message to the sensor component.

3. The system of claim 2, wherein establishing the session with the sensor component further comprises generating, by the second cryptographic coprocessor, the first session key to establish the session with the sensor component, key within the sensor component.

4. The system of claim 1, wherein the sensor component is to perform second operations comprising:
 receiving, from an attestation validator associated with an AV system, a first request to initiate sensor provisioning, wherein the request comprises nonce data;
 in response to receiving the first request to initiate sensor provisioning, obtaining signed nonce data by signing the nonce data using an attestation key;
 generating a first Certificate Signing Request (CSR) with the signed nonce data; and
 sending the first CSR with the signed nonce data to a first certificate authority, wherein the first certificate authority is associated with the attestation validator.

5. The system of claim 4, wherein the second operations further comprise, prior to receiving the first request to initiate sensor provisioning, providing, to the attestation validator, a device state associated with the sensor component.

6. The system of claim 5, wherein the first operations further comprise, prior to receiving the first request to initiate sensor provisioning:
 receiving, from a sensor vendor associated with the sensor component, a second request to initiate sensor provisioning;
 in response to receiving the second request to initiate sensor provisioning, generating the attestation key; and
 performing at least one cryptographic function using an attestation key.

7. The system of claim 6, wherein performing the at least one cryptographic function comprises transmitting a public key to a sensor validation component.

8. The system of claim 6, wherein performing the at least one cryptographic function comprises sending a second CSR to a second certificate authority associated with the sensor vendor, wherein the second CSR is generated using the attestation key.

9. The system of claim 8, wherein the first operations further comprise receiving, from the second certificate authority, an indication that the nonce data is valid.

10. The system of claim 1, wherein the first session key comprises an Advanced Encryption Standard based session key.

11. A method comprising:
 sending, by a processing device of a multi-tenant autonomous vehicle (AV) to a sensor component of a sensing system of the multi-tenant AV, a request to establish a session with the sensor component of the sensing system of the multi-tenant AV, wherein the sensor component of the sensing system of the multi-tenant AV comprises a sensor, a sensor controller and a first cryptographic coprocessor, and wherein the processing device comprises a second cryptographic coprocessor operatively coupled to a hardware accelerator;
 determining, by the processing device, whether the sensor component of the sensing system of the multi-tenant AV acknowledges the request; and
 in response to determining that the sensor component of the sensing system of the multi-tenant AV acknowledges the request, establishing, by the processing device, the session with the sensor component of the sensing system of the multi-tenant AV using a first session key generated by the second cryptographic coprocessor and a second session key generated by the first cryptographic coprocessor of the sensing system of the multi-tenant AV.

12. The method of claim 11, wherein establishing the session with the sensor component comprises sending a secure key exchange message to the sensor component.

13. The method of claim 12, wherein establishing the session with the sensor component further comprises generating, by the second cryptographic coprocessor, the first session key to establish the session with the sensor component, key within the sensor component.

14. The method of claim 11, wherein the sensor component is validated by an attestation validator prior to sending the request to the sensor component.

15. The method of claim 11, wherein the first session key comprises an Advanced Encryption Standard based session key.

16. A non-transitory computer-readable storage medium having instructions stored thereon that, when executed by a processing device, cause the processing device to perform operations comprising:
 sending, to a sensor component of a sensing system of a multi-tenant autonomous vehicle (AV), a request to establish a session with the sensor component of the sensing system of the multi-tenant AV, wherein the sensor component of the sensing system of the multi-tenant AV comprises a sensor, a sensor controller and a first cryptographic coprocessor, and wherein the processing device comprises a second cryptographic coprocessor operatively coupled to a hardware accelerator;

determining whether the sensor component of the sensing system of the multi-tenant AV acknowledges the request; and in response to determining that the sensor component of the sensing system of the multi-tenant AV acknowledges the request, establishing the session with the sensor component of the sensing system of the multi-tenant AV using a first session key generated by the second cryptographic coprocessor and a second session key generated by the first cryptographic coprocessor of the sensing system of the multi-tenant AV.

17. The non-transitory computer-readable storage medium of claim 16, wherein establishing the session with the sensor component comprises sending a secure key exchange message to the sensor component.

18. The non-transitory computer-readable storage medium of claim 17, wherein establishing the session with the sensor component further comprises generating, by the second cryptographic coprocessor, the first session key to establish the session with the sensor component, wherein the first cryptographic coprocessor independently generates the second session key within the sensor component.

19. The non-transitory computer-readable storage medium of claim 16, wherein the sensor component is validated by an attestation validator prior to sending the request to the sensor component.

20. The non-transitory computer-readable storage medium of claim 16, wherein the first session key comprises an Advanced Encryption Standard based session key.

* * * * *